(12) United States Patent
Reiffel

(10) Patent No.: US 7,377,438 B2
(45) Date of Patent: May 27, 2008

(54) COMBINED IMAGING CODED DATA SOURCE DATA ACQUISITION

(76) Inventor: Leonard Reiffel, 602 Deming Pl., Chicago, IL (US) 60614

( * ) Notice: Subject to any disclaimer, the term of this patent is extended or adjusted under 35 U.S.C. 154(b) by 0 days.

(21) Appl. No.: 11/784,615

(22) Filed: Apr. 10, 2007

(65) Prior Publication Data

US 2007/0187506 A1    Aug. 16, 2007

Related U.S. Application Data

(63) Continuation of application No. 10/473,845, filed on Oct. 1, 2003, now abandoned.

(60) Provisional application No. 60/308,699, filed on Jul. 30, 2001, provisional application No. 60/292,113, filed on May 18, 2001, provisional application No. 60/284,836, filed on Apr. 19, 2001.

(51) Int. Cl.
*G02B 26/10* (2006.01)

(52) U.S. Cl. .............................. 235/462.25; 235/462.42

(58) Field of Classification Search .......... 235/462.01, 235/462.09, 462.25, 462.42
See application file for complete search history.

(56) References Cited

U.S. PATENT DOCUMENTS

| 4,053,233 | A | 10/1977 | Bien et al. |
|---|---|---|---|
| 4,099,050 | A | 7/1978 | Sauermann |
| 4,228,430 | A | 10/1980 | Iwamura et al. |
| 4,439,672 | A | 3/1984 | Salaman |
| 4,576,481 | A | 3/1986 | Hansen |
| 4,603,231 | A | 7/1986 | Reiffel et al. |
| 4,637,797 | A | 1/1987 | Whitney et al. |
| 4,650,334 | A | 3/1987 | Alster et al. |
| 4,684,349 | A | 8/1987 | Ferguson et al. |
| 4,857,716 | A | 8/1989 | Gombrich et al. |
| 4,945,914 | A | 8/1990 | Allen |
| 4,980,802 | A | 12/1990 | Champagne |
| 4,998,441 | A | 3/1991 | Stuart |
| 5,009,501 | A | 4/1991 | Fenner et al. |
| 5,107,350 | A | 4/1992 | Omori |
| 5,111,410 | A | 5/1992 | Nakayama et al. |
| 5,115,120 | A | 5/1992 | Eastman |
| 5,181,015 | A | 1/1993 | Marshall et al. |
| 5,214,414 | A | 5/1993 | Levine et al. |
| 5,237,163 | A | 8/1993 | Collins, Jr. et al. |
| 5,260,556 | A | 11/1993 | Lake et al. |
| 5,282,045 | A | 1/1994 | Mimura et al. |
| 5,414,251 | A | 5/1995 | Durbin |
| 5,415,553 | A | 5/1995 | Szmidla |
| 5,446,271 | A | 8/1995 | Cherry et al. |
| 5,448,261 | A | 9/1995 | Koike et al. |

(Continued)

FOREIGN PATENT DOCUMENTS

EP    0062473    10/1982

(Continued)

*Primary Examiner*—Daniel Stcyr
(74) *Attorney, Agent, or Firm*—William J. Hallihan

(57) ABSTRACT

A signal processing means (40) outputs a signal (41) representing a number when a combination of at least two imagers (11), (12) detects a spatial arrangement of a plurality of code portions of a coded data source (60)—where the spatial arrangement of the plurality of code portions represents the number, and where imager combinations can comprise spatial, temporal, and light property combinations.

26 Claims, 1 Drawing Sheet

U.S. PATENT DOCUMENTS

| | | |
|---|---|---|
| 5,453,015 A | 9/1995 | Vogel |
| 5,507,527 A | 4/1996 | Tomikoa et al. |
| 5,537,211 A | 7/1996 | Dial |
| 5,561,543 A | 10/1996 | Ogawa |
| 5,563,401 A | 10/1996 | Lemelson |
| 5,644,126 A | 7/1997 | Ogawa |
| 5,710,416 A | 1/1998 | Belknap et al. |
| 5,712,658 A | 1/1998 | Arita et al. |
| 5,729,220 A | 3/1998 | Russell |
| 5,756,981 A | 5/1998 | Roustaei et al. |
| 5,789,732 A | 8/1998 | McMahon et al. |
| 5,795,161 A | 8/1998 | Vogel |
| 5,821,523 A | 10/1998 | Bunte et al. |
| 5,822,735 A | 10/1998 | De Lapa et al. |
| 5,825,045 A | 10/1998 | Koenck et al. |
| 5,826,578 A | 10/1998 | Curchod |
| 5,835,237 A | 11/1998 | Ebrahimi |
| 5,852,211 A | 12/1998 | Dumpelmann et al. |
| 5,852,823 A | 12/1998 | De Bonet |
| 5,867,265 A | 2/1999 | Thomas |
| 5,912,700 A | 6/1999 | Honey et al. |
| 5,917,472 A | 6/1999 | Perala |
| 5,917,486 A | 6/1999 | Rylander |
| 5,963,145 A | 10/1999 | Escobosa |
| 5,974,150 A | 10/1999 | Kaish et al. |
| 5,982,352 A | 11/1999 | Pryor |
| 5,988,505 A | 11/1999 | Shellhammer |
| 6,000,612 A | 12/1999 | Xu |
| 6,047,893 A | 4/2000 | Saporetti |
| 6,048,117 A | 4/2000 | Banton |
| 6,056,199 A | 5/2000 | Wiklof et al. |
| 6,082,619 A | 7/2000 | Ma et al. |
| 6,118,848 A | 9/2000 | Reiffel |
| 6,121,953 A | 9/2000 | Walker |
| 6,155,489 A | 12/2000 | Collins, Jr. et al. |
| 6,163,946 A | 12/2000 | Pryor |
| 6,167,607 B1 | 1/2001 | Pryor |
| 6,188,388 B1 | 2/2001 | Arita et al. |
| 6,283,375 B1 | 9/2001 | Wilz, Sr. et al. |
| 6,301,763 B1 | 10/2001 | Pryor |
| 6,311,214 B1 | 10/2001 | Rhoads |
| 6,314,631 B1 | 11/2001 | Pryor |
| 6,317,118 B1 | 11/2001 | Yoeno |
| 6,317,953 B1 | 11/2001 | Pryor |
| 6,328,213 B1 * | 12/2001 | He et al. ............... 235/462.25 |
| 6,330,973 B1 | 12/2001 | Bridgelall et al. |
| 6,335,685 B1 | 1/2002 | Schrott et al. |
| 6,446,871 B1 | 9/2002 | Buckely et al. |
| 6,542,083 B1 | 4/2003 | Richley et al. |
| 6,545,670 B1 | 4/2003 | Pryor |
| 6,677,987 B1 | 1/2004 | Girod |
| 6,708,885 B2 | 3/2004 | Reiffel |
| 6,720,949 B1 | 4/2004 | Pryor et al. |
| 6,750,848 B1 | 6/2004 | Pryor |
| 6,766,036 B1 | 7/2004 | Pryor |
| 6,791,531 B1 | 9/2004 | Johnson et al. |
| 6,945,460 B2 | 9/2005 | Reiffel |
| 7,000,840 B2 | 2/2006 | Reiffel |
| 2002/0036617 A1 | 3/2002 | Pryor |
| 2002/0183961 A1 | 12/2002 | French et al. |
| 2003/0222145 A1 | 12/2003 | Reiffel |
| 2004/0027455 A1 | 2/2004 | Reiffel |
| 2004/0041027 A1 | 3/2004 | Reiffel |
| 2004/0125224 A1 | 7/2004 | Reiffel |
| 2004/0135766 A1 | 7/2004 | Reiffel |
| 2004/0188525 A1 | 9/2004 | Reiffel |
| 2004/0195327 A1 | 10/2004 | Reiffel |

FOREIGN PATENT DOCUMENTS

| | | |
|---|---|---|
| EP | 0685809 | 12/1995 |
| EP | 0840248 | 5/1998 |
| EP | 1020810 | 7/2000 |
| FR | 2694827 | 2/1994 |
| JP | 59-071018 | 4/1987 |
| JP | 06-068314 | 3/1994 |
| JP | 06-075052 U | 10/1994 |
| JP | 07-262229 | 10/1995 |
| JP | 07-344606 | 12/1995 |
| JP | 10-187877 | 7/1998 |
| JP | 11-143629 | 5/1999 |
| JP | 2000-148336 | 5/2000 |
| JP | 2000-233810 | 8/2000 |
| JP | 2000-339339 | 12/2000 |
| WO | WO 87/07106 | 11/1987 |
| WO | WO 93/18478 | 9/1993 |
| WO | WO 96/32690 | 10/1996 |
| WO | WO 96/32692 | 10/1996 |
| WO | WO 99/36836 | 7/1999 |
| WO | WO 99/66441 | 12/1999 |
| WO | WO 01/71397 | 9/2001 |
| WO | WO 01/84332 | 11/2001 |
| WO | WO 01/84475 | 11/2001 |
| WO | WO 02/17037 | 2/2002 |
| WO | WO 02/17291 | 2/2002 |
| WO | WO 02/17293 | 2/2002 |
| WO | WO 02/48947 | 6/2002 |
| WO | WO 02/49340 | 6/2002 |
| WO | WO 02/49344 | 6/2002 |
| WO | WO 02/086807 | 10/2002 |

* cited by examiner

COMBINED IMAGING CODED DATA SOURCE DATA ACQUISITION

BACKGROUND OF THE INVENTION

This application is a continuation of application Ser. No. 10/473,845 filed 1 Oct. 2003, now abandoned and also claims benefit of U.S. provisional applications 60/284,836 filed 19 Apr. 2001, 60/292,113 filed 18 May 2001, and 60/308,699 filed 30 Jul. 2001.

A signal processing means, such as a signal processor, 40 outputs a signal 41 representing a number when a combination of at least two imagers 11, 12 detects a spatial arrangement of a plurality of code portions of a coded data source 60—where the spatial arrangement of the plurality of code portions represents the number, and where the imager combinations can comprise spatial, temporal, and light property combinations

BREIF DESCRIPTION OF THE DRAWINGS

FIG. 1 schematically depicts the product.

Figure 1:
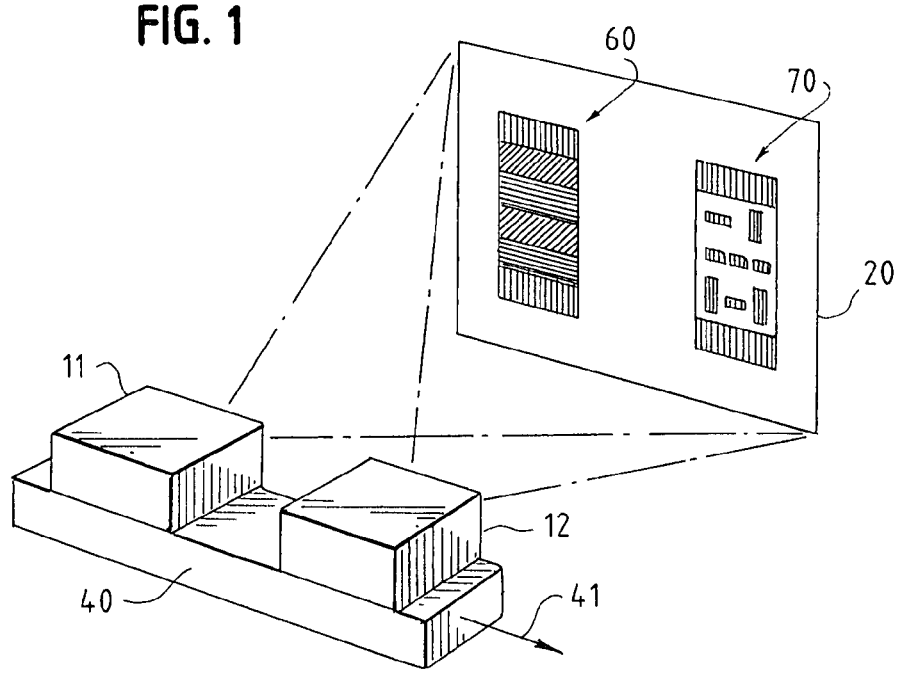

The data acquisition product comprises a first imager 11 which has a first imager field of view, comprises a second imager 12 which has a second imager field of view, comprises a first coded data source 60, and comprises signal processing means 40.

DETAILED DESCRIPTION

The first coded data source has at least a first spatial arrangement of a first plurality of first code portions. The first spatial arrangement of the first plurality of first code portions represents at least a first number.

The first coded data source emanates first light. The first light represents the first spatial arrangement of the first plurality of code portions. The first light is detected by the first imager if the first light is from the first imager field of view and is not occluded. The first light is detected by the second imager if the first light is from the second imager field of view and is not occluded.

The first coded data source can be a member from a plurality of coded data sources each having at least a member specific spatial arrangement of a plurality of first code portions representing at least a member specific number. Coded data sources can be as described in patent application PCTUS/01/13742 filed 30 Apr. 2001 and published as WO 01/84475 on 08 Nov. 2001 which is incorporated herein by reference.

Member specific light from any member from the plurality of coded data sources represents at least the member specific spatial arrangement of the plurality of coded data sources, and, thus, represents at least the member specific number.

The signal processing means is signal connected with the first imager. The signal processing means is signal connected with the second imager. The signal processing means is adapted to cause a signal 41 which represents the first number.

The signal processing means causes the signal if a combination of the first imager and the second imager detects the first spatial arrangement of the first plurality of code portions. The signal need not be an image of the first coded data source, nor be an image of the first spatial arrangement of the first plurality of code portions, the signal need only represent the first number.

The signal processing means can also cause a coordinate signal which represents coordinates of coded data sources relative to some referent. The signal processing means can also cause other signals representing various spatial, temporal, and light property features of coded data sources and of imagers.

The first imager can detect light concurrently from many spatially separated coded data sources from the plurality of coded data sources—for example 60, 70—in the first imager field of view—for example 20. At least the first imager can represent, for the signal processing means, the member specific light from each and all of these coded data sources. The second imager can detect light from many coded data sources—for example 60, 70—in the second imager field of view—for example 20.

At least the first imager field of view can be dense with the plurality of coded data sources. At least an occluded member from the plurality of coded data sources can be occluded. If light from members from the plurality of coded data sources surrounding the occluded coded data source is from the first imager field of view and is not occluded, the first imager can represent the absence of the occluded member for the signal processing means. If light from members of the plurality of data sources surrounding the occluded member is from the second imager field of view and is not occluded, the second imager can represent the absence of the occluded member for the signal processing means. In this case the signal processing means can cause the signal to represent the number represented by the occluded coded data source. When these coded data sources have known locations (which can be fixed and can moving) this signal also represents the location of the occluded coded data source.

Coded data sources can be poles with the member specific spatial arrangements of a plurality of code portions symmetric with respect to rotation abut the pole long axis. The poles need not be densely located. When the poles are in the fields of view of several imagers, the first imager is an imager for which a first pole is temporarily occluded by something moving past a pole, the second imager is an imager which is not occluded by the something, then the signal represents the member specific spatial arrangement of a plurality of code portions of the first pole. When these coded data sources have known locations (which can be fixed and can moving) this signal also represents the location of the first pole.

Light from any coded data source can represent the member specific spatial arrangement of a plurality of code portions by means of various physical properties of light in fixed, variable, and modulated modes. These physical properties of light comprise intensities, frequencies, phases, polarizations, entanglements, blink rates, decay times, external shapes, internal shapes, linear motions, rotational motions, strain motions, distances from at least one reference point, and combinations of physical properties such as these. A spatial arrangement of a plurality of code portions can represent a number by a spatial arrangement of physical properties such as these in fixed, variable, and modulated modes.

For example, a number can be represented by a spatial arrangement of color bands such as those shown 60, 80. For example, a number can be represented by a spatial arrangement of a series of bars—for example retro-reflecting infra red—where the bars each have a long axis longer than a lateral axis such as shown 70. For example, a vertical bar can represent 1 and a horizontal bar can represent 0 so that the number is represented by binary coding. The ways of representing a number are limited only by light properties and possible spatial arrangements thereof.

Light from a coded data source can have various origins such as light reflected from ambient sources, a light source at the coded data source, light emitted after energizing by suitable radiation, light with a characteristic decay time emitted after energizing by suitable radiation, a light source adjacent to the imager illuminating the coded data source, and combinations of sources such as these.

Light from a coded data source is not limited to visible light. For example, infrared can be used, and millimeter and longer wavelengths can be used. Light can be radiating energy from any portion of the electromagnetic spectrum which can provide the functions required here. Other forms of radiating energy—such as acoustic energy—which can provide the functions required here are included in the meaning of "light" here.

There can be a plurality of imagers each being interchangeable with the first imager. There can be a plurality of imagers each being interchangeable with the second imager. A first imager can be a first portion of an imager and a second imager can be a second portion of the imager. A first imager can be an imager operating at a first time and a second imager can be the imager operating at a second time separate from the first time. A first imager can be an imager operating at a first position and a second imager can be the imager operating at a second position separate from the first position.

Various imagers can be used in various modes of operation to provide the functions needed here of the first imager, the second imager, and any subsequent imager. Any of—and all of—the first imager, the second imager, and their respective equivalents can be the dual mode imager of patent application PCTUS/01/13742 filed 30 Apr. 2001 and published as WO 01/84475 on 08 Nov. 2001.

"Detect light" here and throughout means not only detecting the presence of light but also means detecting the specific properties of the light which represent a specific spatial arrangement of a plurality of code portions so that the imager can represent the specific spatial arrangement of a plurality of code portions for the signal processing means. Detecting light concurrently from several spatially separated coded data sources distinguishes the imager from devices such as bar code readers which can not concurrently detect light from several spatially separated bar codes within the meaning of "detect" here.

A "signal" from a first product part to a second product part and a first product part being "signal connected" with a second product part here, and throughout, mean that a first physical state of the first product part causes a second physical state of the second product part. This can occur by various direct causal means and can occur by any of various transmission means. Transmitted signals can be any of various point-to-point and broadcast forms of energy transmission such as wireless and via wires, cables, and fibers. Parts of transmitted signals can reside with one form of the transmitted signal, parts can reside with a second form of transmitted signal, and parts can reside with various combinations of transmitted signals.

The several causes and representations here can act via any of various processing means. The processing can utilize configured processing elements such as fixed circuits, can utilize configurable processing elements such as field programmable gate arrays and neural networks, can utilize instructions in a data-bearing medium, and can utilize combinations of these. The processing can be stand alone, can act via a local information system, can act via a networked information system, and can act via combinations of these.

A signal representing the first number—and any subsequent numbers—is caused by the signal processing means when an imager combination detects the first spatial arrangement of the first plurality of code portions of the first coded data source—and detects any subsequent member specific arrangements of pluralities of code portions of any subsequent coded data sources. Imager combinations are combinations of at least two imagings. The imagings can be by the first imager and the second imager for example. What is true of first imager and second imager combinations is true of combinations of more than two imagings. Imager combinations can comprise several spatial, temporal, and light property combinations in order to detect a spatial arrangement of a plurality of code portions.

In an imager combination, the second imager causes the first field of view to include the first coded data source if the first light is from the second imager field of view and is not occluded, and the first imager causes the first light to be represented for the signal processing means.

For example, if the coded data source is not in the first imager field of view when the second imager detects the presence of the first light, then the second imager can cause the first imager field of view to change until the first data source is in the first imager field of view.

In this combination, the second imager can have a second imager field of view more than twice larger area-wise than the first imager field of view. The second imager can be a low resolution imager. The first imager field of view can be caused to include little more than the first coded data source. The second imager can be sensitive to only a narrow range of one—and more—light properties.

In this combination the first imager can be a sub system of the second imager. For example, the second imager can be a full detection area and the first imager can be a part of the full detection area.

In an imager combination, the first imager causes a first light property portion of the first light to be represented for the signal processing means if the first light is from the first imager field of view and is not occluded. The second imager causes a second light property portion of the first spatial arrangement of the first light to be represented for the signal processing means if the first light is from the second imager field of view and is not occluded. The signal processing means uses the first light property portion caused to be represented and the second light property portion caused to be represented to cause the signal.

The first and second light property portions can be portions of the various physical light properties described above. For example, the first light property portion can be a first frequency portion and the second light property portion can be a second frequency portion. In this example the first frequency portion can be red light, the second frequency portion can be green light, and a third frequency portion—represented for the signal processing means by a third imager if the first light is from the third imager field of view—can be blue light.

In an imager combination, the first imager causes a first representation of the first light to be represented for the signal processing means at a first time if the first light is from the first imager field of view and is not occluded at the first time. The second imager causes a second representation of the first light to be represented for the signal processing means at a second time if the first light is from the second imager field of view and is not occluded at the second time.

The signal processing means uses the first representation and the second representation to cause the signal to represent the first number at the first time and the second time.

For example, there can be an array of N imagers comprising the first imager, the second imager, and subsequent imagers. The array views a field of view. Each member imager in the array views a member specific imager field of view. Each member specific imager field of view can fully overlap the full field of view. There can be various relations among the member specific imager fields of view so long the whole array can comprehend the full field of view.

The N imagers each begin imaging with time delays between imagers of 1/N of the 1/T imaging frequency of each imager. Thus, in an N equals 4 case, the first imager begins imaging at times T, 2T, 3T, etc.; the second imager begins imaging at times T(1+1/4), T(2+1/4), T(3+1/4), etc.; a third imager begins at times T(1+2/4), T(2+2/4), T(3+2/4), etc.; and a fourth imager begins at times T(1+3/4), T(2+3/4), T(3+3/4), etc. This yields an effective imaging frequency of 4/T for the whole array.

In an imager combination, the second imager field of view is adjacent to the first imager field of view. The first imager causes a first portion of the first light to be represented for the signal processing means if the first portion of the first light is from the first imager field of view and is not occluded. The second imager causes a second portion of the first light to be represented for the signal processing means if the second portion of the first light is from the second imager field of view and is not occluded. The signal processing means uses the first portion caused to be represented and the second portion caused to be represented to cause the signal.

Figure 3:
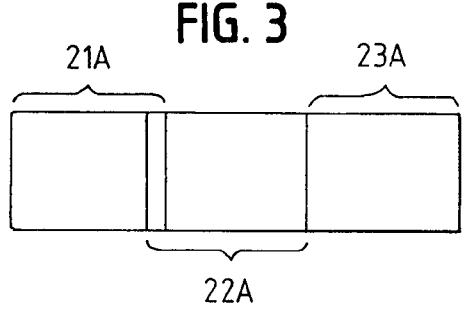
FIG. 3 depicts three adjacent imager fields of view 21A, 22A, 23A.

FIG. 3 depicts three adjacent imager fields of view 21A, 22A, 23A. The first imager field of view 21A slightly overlaps the second imager field of view 22A. The second imager field of view abuts a third imager field of view 23A. Slightly overlapping and abutting are both included in the meaning of "adjacent" here.

In an imager combination, the first imager detects light by scanning substantially parallel to first axis 101. The second imager detects light by scanning substantially parallel to a second axis 102. The first axis is not parallel to the second axis. The first imager causes the first spatial arrangement of the first plurality of code portions to be represented for the signal processing means as soon as the first spatial arrangement of the first plurality of code portions is detected by the first imager, if the first spatial arrangement of the first plurality of code portions is detected by the first imager. The second imager causes the first spatial arrangement of the first plurality of code portions to be represented for the signal processing means as soon as the first spatial arrangement of the first plurality of code portions is detected by the second imager, if the first spatial arrangement of the first plurality of code portions is detected by the second imager. The signal processing means uses the first in time first spatial arrangement of the first plurality of code portions caused to be represented to cause the signal.

Figure 2:
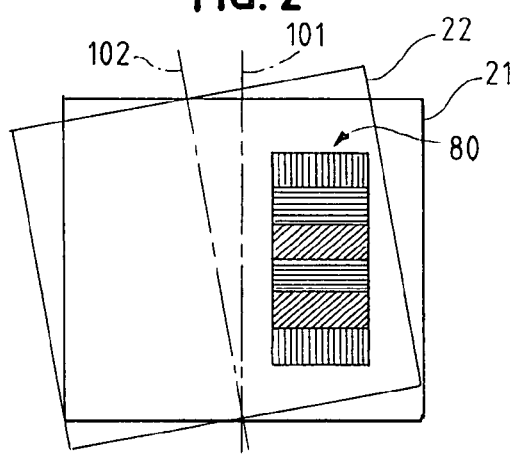
FIG. 2 depicts two imager fields of view 21, 22.

FIG. 2 depicts a coded data source 80 in the first imager field of view 21 and in the second imager field of view 22. The first imager, scans substantially parallel to axis 101. The second imager scans substantially parallel to axis 102. The first imager will detect the spatial arrangement of the plurality of code portions of the coded data source 80 before the second imager scans enough of the spatial arrangement to detect the spatial arrangement. A plurality of imagers scanning along non-parallel axes will minimize the time to acquire data and will eliminate the need to orient the imager—or the coded data source—to detect the spatial arrangement.

In an imager combination, the first light is at least partially retro-reflected from a light source. The first imager, the second imager, and the light source are positioned so that more first light is retro-reflected to the first imager than to the second imager. The first imager causes a first representation of the first light to be represented along with all light detected by the first imager for the signal processing means if the first light is from the first imager field of view and is not occluded. The second imager causes a second representation of the first light to be represented along with all light detected by the second imager for the signal processing means if the first light is from the second imager field of view and is not occluded. The signal processing means uses the first representation and the second representation to represent the first number. The signal processing means also uses all light caused to be represented by the first imager and all light caused to be represented by the second imager to cause the signal.

In this combination the retro-reflected light detected by the first imager will be more intense than the retro-reflected light detected by the second imager. Both imagers may detect light not emanating from the first coded data source. Subtraction of all light caused to be represented by the second imager from all light caused to be represented by the first imager reduces the light not from the first coded data source represented for the signal processing means.

What is claimed is:

1. A data acquisition product comprising:
   a first imager,
   the first imager having a first imager field of view;
   a first coded data source,
   the first coded data source having a first spatial arrangement of a first plurality of first code portions,
   the first spatial arrangement of the first plurality of first code portions representing a first number;
   first light being detected by the first imager if the first light is from the first imager field of view
   first coded data source light representing the first spatial arrangement of the first plurality of code portions; and
   a signal processor,
   the signal processor being coupled to the first imager, and
   the signal processor being adapted to cause a signal which represents the first number if the first coded data source light is in the first field of view and is occluded from the first light detected by the first imager.

2. The product of claim 1, further comprising:
   a second imager,
   the second imager having a second imager field of view;
   first light being detected by the second imager if the first light is from the second imager field of view; and
   the signal processor being adapted to cause the signal if a combination of the first imager and the second imager detects the first spatial arrangement of the first plurality of code portions.

3. The product of claim 2 wherein the signal processor causes the signal if the first coded data source is within the second field of view and the first coded data source light is occluded from the first light detected by the second imager.

4. The product of claim 2, wherein:
   the first coded data source comprises a member specific spatial arrangement of a plurality of code portions;

the first coded data source is within the first field of view and the first coded data source light is temporarily occluded from the first light detected by the first imager;

the first coded data source is within the second field of view and the first coded data source light is not occluded from the first light detected by the second imager; and the signal represents the member specific spatial arrangement of the plurality of code portions of the first coded data source.

5. The product of claim 2 wherein:

the second imager causes the first imager field of view to include the first coded data source if the first coded data source is in the second imager field of view and the first coded data source light is not occluded in the first light detected by the second imager; and the first imager causes the first light to be represented for the signal processing means.

6. The product of claim 2 wherein:

the first imager causes a first representation of a first light property portion of the first light to be represented for the signal processor if the first light is from the first imager field of view and is not occluded;

the second imager causes a second representation of a second light property portion of the first light to be represented for the signal processor if the first light is from the second imager field of view and is not occluded; and the signal processor uses the first representation and the second representation to cause the signal.

7. The product of claim 6 wherein the first light property portion is a first frequency portion and the second light property portion is a second frequency portion.

8. The product of claim 7 wherein:

the second imager field of view is adjacent to the first imager field of view;

the first imager causes a first portion of the first spatial arrangement of the first plurality of code portions to be represented for the signal processor if the first portion of the first spatial arrangement of the first plurality of code portions is in the first imager field of view;

the second imager causes a second portion of the first spatial arrangement of the first plurality of code portions to be represented for the signal processor if the second portion of the first spatial arrangement of the first plurality of code portions is in the second imager field of view; and the signal processor uses the first portion caused to be represented and the second portion caused to be represented to cause the signal.

9. The product of claim 2 wherein:

the first imager detects light by scanning substantially parallel to first axis;

the second imager detects light by scanning substantially parallel to a second axis;

the first axis is not parallel to the second axis;

the first imager causes the first spatial arrangement of the first plurality of code portions to be represented for the signal processor as soon as the first spatial arrangement of the first plurality of code portions is detected by the first imager, if the first spatial arrangement of the first plurality of code portions is detected by the first imager;

the second imager causes the first spatial arrangement of the first plurality of code portions to be represented for the signal processor as soon as the first spatial arrangement of the first plurality of code portions is detected by the second imager, if the first spatial arrangement of the first plurality of code portions is detected by the second imager; and the signal processor uses the first in time spatial arrangement of the first plurality of code portions caused to be represented to cause the signal.

10. The product of claim 2 wherein:

the first light is at least partially retro-reflected from a light source;

the first imager, the second imager, and the light source are positioned so that more first light is retro-reflected to the first imager than to the second imager;

the first imager causes a first representation of the first light to be represented for the signal processor if the first light is from the first imager field of view and is not occluded;

the second imager causes a second representation of the first light to be represented for the signal processor if the first light is from the second imager field of view and is not occluded; and the signal processor uses the first representation and the second representation to cause the signal.

11. A data acquisition product as claimed in claim 2, further comprising:

a light source;

a portion of the first light comprises retro-reflected light from the light source;

the first imager, the second imager and the light source positioned so that more first light is retro-reflected to the first imager than to the second imager;

a first representation of the first light being detected by the first imager, if the first light is from the first imager field of view;

a second representation of the first light being detected by the second imager, if the first light is from the second imager field of view;

wherein the second representation of the first light subtracted from the first representation of the first light approximates the first coded data source light.

12. The product of claim 1, further comprising:

a plurality of spatially separated coded data sources in the first field of view;

the first imager being able to detect light concurrently from each of the plurality of spatially separated coded data sources that are not occluded from the first light detected by the first imager, and the signal processor being adapted to cause a signal which represents the first number if the first coded data source light is within the first field of view and is occluded from the first light detected by the first imager.

13. The product of claim 12 wherein the first imager causes a representation, to be represented for the signal processor, of member specific light from each of the plurality of spatially separated coded data sources that are within the first field of view and that not occluded from the first light detected by the first imager.

14. The product of claim 12 wherein the first imager causes a first representation, to be represented for the signal processor, of the absence of the first coded data source if the first coded data source light is within the first field of view and is occluded from the first light detected by the first imager.

15. The product of claim 1 wherein a first coded data source has a known location.

16. The product of claim 15, wherein the signal represents the location of the first coded data source.

17. A method of acquisitioning data comprising:
   representing a first number with a first coded data source, having a first spatial arrangement of a first plurality of first code portions
   representing the first spatial arrangement of the first plurality of code portions with first coded data source light from the first coded data source;
   detecting first light with a first imager if the first light is from a first imager field of view;
   causing a signal which represents the first number if the first coded data source light is in the first field of view and is occluded from the first light detected by the first imager.

18. The method of claim 17, further comprising:
   providing a plurality of spatially separated coded data sources in the first field of view;
   detecting light, with the first imager, concurrently from each of the plurality of spatially separated coded data sources that are not occluded from the first light detected by the first imager, and
   causing a signal which represents the first number if the first coded data source light is within the first field of view and is occluded from the first light detected by the first imager.

19. The method of claim 18 further comprising representing for the signal processor, by the first imager, member specific light from each of the plurality of spatially separated coded data sources that are within the first field of view and that not occluded from the first light detected by the first imager.

20. The method of claim 19 further comprising representing for the signal processor, by the first imager, the absence of the first coded data source if the first coded data source light is within the first field of view and is occluded from the first light detected by the first imager.

21. The method of claim 18, further comprising:
   detecting the first light by a second imager if the first light is from a second imager field of view; and
   causing the signal if a combination of the first imager and the second imager detects the first spatial arrangement of the first plurality of code portions.

22. The method of claim 21 further comprising causing the signal if the first coded data source is within the second field of view and the first coded data source light is occluded from the first light detected by the second imager.

23. The method of claim 21, wherein the first coded data source comprises a member specific spatial arrangement of a plurality of code portions, the first coded data source is within the first field of view, and the first coded data source is within the second field of view and the first coded data source light is not occluded from the first light detected by the first imager, the method further comprising:
   detecting when the first coded data source light is temporarily occluded from the first light detected by the first imager, wherein the signal represents the member specific spatial arrangement of the plurality of code portions of the first coded data source.

24. The method of claim 21 further comprising causing the first imager field of view to include the first coded data source if the first coded data source is in the second imager field of view and the first coded data source light is not occluded in the first light detected by the second image, wherein the first imager causes the first light to be represented for the signal processing means.

25. The method of claim 24 further comprising causing the first imager filed of view to change until the first data source is in the first imager filed of view.

26. The method of claim 17, wherein the signal represents a known location of the first coded data source.

* * * * *